United States Patent Office 3,591,475
Patented July 6, 1971

3,591,475
PREPARATION OF UNSYMMETRICAL
THIOL-ALLENE DIADDUCTS
Karl Griesbaum, Forchheim, Germany, and Alexis A. Oswald, Mountainside, and Daniel Noyes Hall, Linden, N.J., assignors to Esso Research and Engineering Company
No Drawing. Continuation-in-part of application Ser. No. 368,351, May 18, 1964, now Patent No. 3,340,332. This application Dec. 9, 1968, Ser. No. 782,466
Int. Cl. B01j 1/10; C07c 149/06, 149/26
U.S. Cl. 204—158R    19 Claims

ABSTRACT OF THE DISCLOSURE

Unsymmetrical thiol-allene diadducts [1,3- and 1,2-bis (substituted mercapto)-propanes] are prepared by the free radical and/or ionic addition of a thiol compound to a monoadduct allyl sulfide or through the sequential addition of two different thiol compounds to allene. Diadducts containing a dialkyl dithiophosphoric acid constituent and either an alkyl or aryl thiol constituent are effective agricultural chemicals.

CROSS REFERENCE TO RELATED APPLICATION

This application is a continuation-in-part of Ser. No. 368,351, filed May 18, 1964, now U.S. Pat. 3,340,332.

BACKGROUND OF THE INVENTION (I) Field of the invention

This invention relates to new processes for the preparation of unsymmetrical thiol-allene diadducts and to the utilization of the products produced with the processes as pesticidal compositions. More particularly, this invention relates to the synthesis of unsymmetrical 1,3- and 1,2-bis-(substituted mercapto)-propanes by the addition of an organic thiol to a monoadduct allyl sulfide or by the sequential addition of different thiols to allene. Products of the processes find particular utility as insecticides, miticides and nematocides.

(II) Description of the prior art

Compounds related to the unsymmetrical 1,3- and 1,2-bis-(substituted mercapto)-propanes produced with the present process namely, 1,2-bis(substituted mercapto)-ethanes, have been prepared by the prior art workers. The prior art unsymmetrical ethane compositions were conventionally prepared using simple displacement reactions involving either an alpha- or betachloroalkyl sulfide with the thiol salt. The unysmmetrical ethane compositions were also prepared by reacting a metal sulfide with an alkyl halide. The above described processes are set forth in detail in U.S. 2,759,010, U.S. 2,793,224, U.S. 2,976,311 and U.S. 3,004,980.

SUMMARY OF THE INVENTION

In accordance with the present invention, unsymmetrical thiol-allene diadducts are formed by (a) the addition of a specific thiol reagent to a monoadduct allyl sulfide or (b) the sequential addition of different thiols to allene. The hydrogen donor abilities of the thiols employed in the processing step are an important feature of the invention, in that, hydrogen donor ability is critical to the selection of the thiol compound that is added to a monoadduct allyl sulfide and, in the case of additions to allene, the order of addition of the different thiols is dictated by the respective hydrogen donor abilities with thiol of lower ability being added first. The unsymmetrical products of these reactions, particularly those compounds that are prepared utilizing a dialkyl-dithiophosphoric acid as one of the thiol reactants, possess properties that makes them suitable for use as agricultural chemicals.

The free radical type reactions contemplated by this invention may be represented as follows:

I.
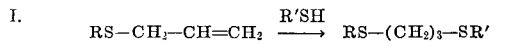

II.
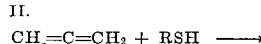
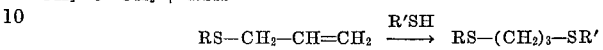

Equation I illustrates the reaction of a thiol compound with a monoadduct allyl sulfide to form an unsymmetrical thiol-allene diadduct. Equation II shows the sequential addition of two differing thiols to allene in order to arrive at the unsymmetrical diadduct product. The intermediate material of Equation II is identical to the starting material of Equation I. As will be noted more fully hereinafter, the thiol reactant employed in Equation I (R'SH) preferably has a higher hydrogen donor ability than the thiol (RSH) corresponding to the RS— radical of the monoadduct allyl sulfide starting material. In Equation II the thiol reactant having the lower hydrogen donor ability (RSH) is preferably added in the first step of the overall reaction.

The second addition step involving the reaction of the thiol compound with the allyl sulfide can be also carried out via an ionic mechanism yielding unsymmetrical 1,2-bis(substituted mercapto)-propane diadducts. The reactions contemplated proceed as follows:

III
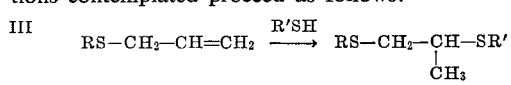

IV
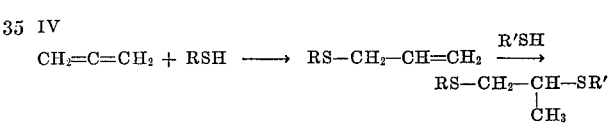

The ionic additions again preferably involve the use of a thiol compound (R'SH) of higher hydrogen donor ability in the final portion of the overall reactions. The ionic addition reactions proceed at higher rates at elevated hydrogen ion concentration. The higher rate of the reaction is believed to be explained by the following mechanism:

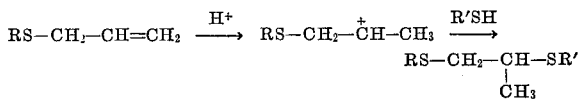

If the thiol reactant (R'SH) is too weak an acid and, therefore, is unable to provide the concentration of hydrogen ions necessary for a significant reaction rate, the reaction may be promoted by the addition of strong acid catalysts, such as perchloric acid, sulfuric acid, boron trifluoride, toluene sulfonic acid and methane sulfonic acid. The acid catalysts may be used in concentrations ranging from 0.2 to 20 mole percent preferably 0.5 to 5 mole percent, based on total reactants. The reaction rate of the ionic additions is also strongly affected by the reaction temperature. By raising the reaction temperature practical reactant conversions may be reached without the addition of extra acid catalysts.

The ionic and the free radical addition to allyl sulfides may occur concurrently. If a free radical type addition is desired, a free radical type catalyst is employed and the reaction is carried out at relatively low temperature where the rate of the competing ionic reaction becomes insignificant. To obtain high yields of the ionic-type product, it may be necessary to add a free radical inhibitor to suppress the radical type reaction. Useful inhibitors include sulfur, alkylphenols, hydroquinone, phosphorus sesquisulfide, etc. The presence of an inhibitor may be important when elevated reaction temperatures are used since heat and/or oxygen may also initiate a free radical type reaction in the absence of inhibitors.

The RSH and R'SH reactants that are employed in the above reactions are different members of the group of compounds wherein R and R' are monovalent organic radicals containing 1 to 30 carbon atoms which may be defined as follows:

R and R' are $C_1$ to $C_{20}$, preferably $C_1$ to $C_{10}$ alkyl groups, e.g., methyl, ethyl secondary butyl, 2-ethylhexyl, n-decyl, tertiary-dodecyl, nonylhexadecyl, nonyloctadecyl, etc.;

R and R' are $C_4$ to $C_{20}$, preferably $C_4$ to $C_{10}$ cyclic groups, containing at least one oxygen, sulfur or nitrogen atom, for example, benzothiazyl, pyridyl, furfuryl, thiazyl, thienylmehtyl, pyrryl, pyranyl, etc.;

R and R' are $C_6$ to $C_{14}$, preferably $C_6$ to $C_{12}$ aryl or haloaryl groups, e.g. phenyl, naphthyl, halophenyl, chlorophenyl, trichloronaphthyl, etc.;

R and R' are $C_7$ to $C_{30}$, preferably $C_7$ to $C_{15}$ alkylaryl groups, e.g., nonylphenyl, xylyl, dodecylphenyl, tolyl, diethylnaphthyl, octadecylphenyl, etc.;

R and R' are $C_7$ to $C_{30}$, preferably $C_7$ to $C_{15}$ arylalkyl groups, for example, benzyl, phenylisopropyl, naphthylmethyl, ethylbenzyl, trimethylbenzyl, etc.;

R and R' are $C_1$ to $C_{30}$, preferably $C_1$ to $C_{10}$ non-hydrocarbon substituted alkyl groups, for example, aminoethyl, hydroxyethyl, cyanoethyl, mercaptoethyl, carboxyethyl, chloroethyl, carbomethoxyethyl, carbolauryloxypropyl, carbolauryloxyethyl, carbooctadecyloxyethyl, etc.;

R and R' are $C_6$ to $C_{30}$, preferably $C_7$ to $C_{30}$ non-hydrocarbon, non-halogen substituted aryl or alkylaryl groups, for example, hydroxyphenyl, nitrotolyl, aminophenyl, methylthiophenyl, ethylsulfinylphenyl, cyanotolyl, nitronaphthyl, etc.;

R and R' are acyl radicals having the structural formula:

wherein Z is a $C_1$ to $C_{18}$, preferably, a $C_1$ to $C_{10}$ hydrocarbyl radical, for example, alkyl radicals, alkenyl radicals, aryl radicals or alicyclic radicals and most preferably a lower alkyl radical such as a $C_1$ to $C_3$ alkyl radical; and R and R' are dihydrocarbyloxythiophosphoryl or dihydrocarbyloxyphosphoryl groups having the structure:

wherein Y is a sulfur or oxygen atom, preferably a sulfur atom, X and X' are $C_1$ to $C_{18}$, preferably $C_1$ to $C_{10}$ hydrocarbyl radicals, for example, alkyl radicals, alkenyl radicals, aryl or alicyclic radicals; most preferably X and X' are $C_1$ to $C_3$ lower alkyl groups. Representative examples of useful thiol acids, monothiophosphoric acids and dithiophosphoric acids include thiolacetic acid, thioldodecanoic acid, thiolbenzoic acid, thiolcrotylic acid, thiolcyclohexane carboxylic acid, diethyldithiophosphoric acid, dimethylmonothiophosphoric acid, diphenylmonothiophosphoric acid, dioctylphenylthiophosphoric acid, etc.

The thiol reactants used in the present process are selected in such a manner that the R and R' groups of the desired unsymmetrical diadduct product are different substituents.

The preferred R'SH reactants are the above-described dihydrocarbylthiophosphoryl materials wherein X and X' are $C_1$ to $C_3$ alkyl groups used in conjunction with $C_1$ to $C_4$ alkyl thiols such as methane thiol or $C_6$ to $C_9$ aryl thiols and haloaryl thiols such as benzenethiol, p-chlorobenzenethiol, bromobenzenethiol or dichlorobenzenethiol. These reactions are preferred as they lead to the production of unsymmetrical diadducts having the structural formula:

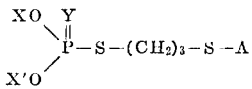

wherein A are alkyl, aryl or haloaryl groups of the types previously defined. These latter compounds have been found to have desirable pesticidal properties.

The 1,3-bis-(substituted mercapto)-propanes are highly effective agricultural chemicals. The subject materials are markedly superior to known substituted mercapto ethanes and methanes both in pesticidal activity and toxicity toward warm blooded animals. This activity is surprising in view of the relative biological inactivity of gamma-chloroalkyl sulfides when compared to the beta-chloroalkyl sulfides (mustards).

It has been found that due to the nature of the process reactants and the reactions themselves, the free radical reaction for the formation of the diadducts may result in the formation of symmetrical diadducts in preference to the desired mixed or unsymmetrical diadducts. Symmetrical diadduct formation is generally due to a phenomenon known as allylic reversal. It has now been discovered that the tendency to form the symmetrical diadduct is dependent upon the relative hydrogen donor ability of the thiol reactants. Hence, using a thiol (R'SH) that has a higher hydrogen ability than the thiol (RSH) corresponding to the RC-radical of the starting or intermediate monoadduct allyl sulfide is critical to the formation of good yields of the preferred mixed or unsymmetrical diadduct. When the monoadduct allkyl sulfide is secured through the reaction of a thiol with allene, the thiol sulfide should have the superior hydrogen donor ability of the two thiol reactants. In case the thiol reactant used in the second step of Equation II has inferior hydrogen donor ability, large amounts of the corresponding symmetrical 1,3-bis-(substituted mercapto)-propanes are formed.

The relative hydrogen donor ability of a particular thiol reactant may be determined by reference to the chemical literature on chain transfer constants in polymerization reactions since the chain transfer constant is directly proportional to hydrogen donor ability. One method of determining chain transfer constants for thiols is described by J. L. O'Brien and F. Gornick, J. Am. Chem. Soc. 77, 4757 (1955). This method involves a mathematical determination of the chain transfer constant from data on monomer and thiol concentrations and degree of polymerization in a free radical initiated polymerization reaction. Alternatively, hydrogen donor ability may be measured by the ease with which 2-cyano-2-propyl radicals will abstract hydrogen from RSH as determined by the yield of RSSR dimer which is produced by combination of the thiyl radicals after hydrogen abstraction. This latter method is more fully described by P. Bruin et al., Recueil, 71, 1115 (1952).

The reactions contemplated by the process of this invention (Equations I and II) involve free-radical reactions between monoadduct allyl sulfide and a thiol and between allene and a thiol. Such free-radical reactions are typically carried out in the presence of a free-radical initiator, particularly, a chemical initiator or radiation. Examples of radiation free-radical initiators include ultraviolet light, gamma radiation, heat, etc. Useable chemical initiators include peroxidic and azo compounds such as cumene hydroperoxide, tertiary butyl hydroperoxide, bis-tertiary butyl peroxide, bis-azo-isobutyronitrile, dicumyl peroxide, benzoyl peroxide, etc. The various types of free-radical initiators may be employed alone or in combination with each other, e.g. a combination of ultraviolet light and an azo or peroxide compound. Typically, chemical initiators are used within the reaction zone at levels ranging from 0.01 to 10, preferably 0.1 to 3 mole percent based on thiol reactant.

A wide range of reaction conditions may be employed in the process of this invention. Reaction temperatures suitable for both the formation of the monoadduct allyl sulfide from a thiol and allene and the free radical reaction of a monoadduct allyl sulfide with a further thiol fall in the range of from −100 to 50° C., preferably −40 to 100° C., most preferably at temperatures from 0 to 50° C. Reaction temperatures for the ionic reaction of the monoadduct allyl sulfide with a further thiol may also range from −100 to +150° C. However, it is preferable that these reactions be carried out between 0 to 150° C., most preferably at temperatures exceeding 50° C.

It is desired that the reaction be conducted in the liquid phase; hence, pressure within the reaction zone is adjusted to maintain liquid phase conditions. In the production of monoadducts starting with the low boiling allene, higher pressures are used. Reaction pressure is not a critical variable in the process and depending upon other process conditions superatmospheric as well as atmospheric pressures may be employed. Typical reaction pressures vary in the range of from 0 to 750 p.s.i.g. and preferably from 14 to 150 p.s.i.g., e.g., 50 p.s.i.g. The reaction period can also vary over a wide range. The reaction time is strongly dependent upon the nature of the process reactants, type of catalyst, temperature and pressure conditions, etc. Hence, appreciable yields of the desired unsymmetrical diadducts can be secured in time periods varying from a few minutes to several days.

The instant reactions may be carried in bulk, that is, in the absence of a solvent or in the presence of an inert organic diluent that does not enter into or interfere with the reactions. Hydrocarbons, chlorinated hydrocarbons, ethers, thioethers, etc., can be used. Examples of useful diluents include cyclohexane, cyclooctane, benzene, toluene, tetrahydrofuran, diglyme, etc. The ratio of the process reactants to solvent is not critical and may vary over a wide range. Unless the process reactants are solid materials, it is preferable to avoid using solvents because their presence serves to (a) introduce separation problems into the process and (b) reduce reactant concentration during reaction thereby diminishing process efficiency. In situations where solvents are employed, at least about 10 volume percent of solvent, based on total reactants, is used.

The relative ratio of process reactants within the reaction zone is a critical feature of this invention. The reaction involving the addition of a thiol of relatively low hydrogen donor ability to allene must be carried out under conditions that favor the formation of the monoadduct allyl sulfide product. It is possible to form a symmetrical thiol-allene diadduct during this step. The formation of the allyl sulfide monoadduct is favored by having a molar excess of allene present within the reaction zone. It is desirable to have at least about 1.2 moles of allene present within the reaction zone per mole of thiol. Preferably, the molar ratio of allene to thiol should be maintained in the range of 2:1 to 10:1 and most preferably between about 3:1 to 5:1. Further information concerning the formation of monoadduct allyl sulfides is contained in U.S. Ser. No. 368,345, filed May 18, 1964, now Pat. No. 3,398,200, which disclosure is herein incorporated by reference.

The reaction for the formation of the unsymmetrical thiol-allene diadduct does not require the use of excess process reactants within the reaction zone; however, product formation has been found to be favored by employing a molar excess of the thiol reactant relative to the monoadduct allyl sulfide. Desirably, about 1.2 moles of thiol reactant is utilized per mole of monoadduct allyl sulfide. Preferably, molar ratios of thiol to monoadduct allyl sulfide in the range of 3:2 to 10:1 and more preferably between 3:1 and 5:1 may be employed. The higher the hydrogen donor ability of the thiol, the less thiol excess is necessary for a high yield of the desired unsymmetrical products.

In the formation of unsymmetrical adducts by the sequential addition of two different thiols to allene, intermediate monoadduct allyl sulfide should, in general, be separated from the unreacted thiol employed in the first stage operations prior to contacting the same with the thiol of higher hydrogen donor ability. If the first thiol is not separated from the monoadduct allyl sulfide, the possibility exists that selectivity to the desired unsymmetrical product may be diminished in the second portion of the operation. Typically, the reaction product from the reaction of a thiol with a monoadduct alkyl sulfide conducted using a thiol having a hydrogen donor ability superior to the hydrogen donor ability of the thiol corresponding to the —SR radical of the monoadduct allyl sulfide contains at least about 50 mole percent of the desired mixed diadduct. In most instances, the crude reaction product contains at least about 85 to 100 mole percent of the unsymmetrical diadduct.

While the invention has been described with respect to a preferred two-step reaction involving the addition of a thiol to allene in the first step, it will be understood by those skilled in the art that the preparation of the monoadduct may be carried out by any conventional method known in the prior art. The manner of preparing the monoadduct is limited only by the structure of the desired di-adduct, i.e., the thiyl group of the monoadduct must be of lower hydrogen donor ability than the thiyl group to be added in the free-radical addition to form the di-adduct.

As noted earlier, a number of products formed with the instant process find utility as agricultural chemicals. Products of the process have many other different uses. For example, the unsymmetrical thiol-thiophosphoric acid adducts can be used as animal health agents, e.g., for controlling animal parasites. The thiol-mercaptopropionic ester adducts are effective stabilizers for polyolefins such as polypropylene plastics. The unsymmetrical adducts are also antioxidant and anticorrosion agents and as such can be used as additives for hydrocarbon oils such as mineral oil lubricants.

DESCRIPTION OF THE PREFERRED EMBODIMENTS

The invention will be further understood by reference to the following illustrative examples.

EXAMPLE 1

A mixture of 5.5 grams (0.05 mole) of benzenethiol and 5.1 grams (0.05 mole) of allyl ethyl sulfide was irradiated with ultraviolet light in a quartz tube at 20° C. for 6 hours. Analysis of the reaction mixture by gas-liquid chromatography and nuclear-magnetic resonance spectroscopy showed that the mixed diadduct, 1-ethylmercapto 3-phenylmercaptopropane constituted 89 mole percent of the product mixture. The other identifiable reaction products were allyl phenyl sulfide and 1,3-bis-phenylmercaptopropane.

In a series of reactions identical to that described above, allyl ethyl sulfide was reacted with n-propyl mercaptan, isobutyl mercaptan and tertiary butyl mercaptan. The results are summarized in Table I.

TABLE I

| R'SH | Mole percent mixed diadduct in product mixture | Chain transfer constant [1] |
|---|---|---|
| Phs— | 89 | 2.7 |
| $CH_3CH_2CH_3S$— | 65 | [2] |
| $(CH_3)_2CHS$— | 58 | 0.38 |
| $(CH_3)_3CS$— | 50 | 0.18 |

[1] J. O'Brien and F. Gornick, J. Am. Chem. Soc. 77, 4757 (1955).
[2] $CH_3CH_2CH_2CH_2SH$ has a constant of 0.66.

These results show that the reaction selectivity towards the mixed diadduct increased with the hydrogen donor ability of the second thiol (R'SH) as measured by chain transfer data for thiols taken from the literature. The mixed diadducts, i.e., 1,3-bis-(substituted mercapto)-propanes, were isolated by fractional distillation. As shown in Table II, the physical and analytical data of the products confirmed their structure.

TABLE II

Physical and Analytical Data of 1,3-Bis (Substituted Mercapto) Propanes

| Formula | | B.P., | | Calculated, Percent | | | Found, percent | | |
|---|---|---|---|---|---|---|---|---|---|
| Structural | Empirical | ° C. | mm. | C | H | S | C | H | S |
| $C_2H_5S(CH_2)_3SPh$ | $C_{11}H_{16}S_2$ | 120-121 | 1.2 | 62.25 | 7.60 | 30.15 | 62.56 | 7.63 | 29.78 |
| $C_2H_5S(CH_2)_3S(CH_2)_2CH_3$ | $C_8H_{18}S_2$ | 72-73 | 0.25 | 53.91 | 10.18 | 35.91 | 53.81 | 10.05 | 35.31 |
| $C_2H_5S(CH_2)_3SCH(CH_3)_2$ | $C_8H_{18}S_2$ | 58-59 | 0.25 | 53.91 | 10.18 | 35.91 | 53.60 | 9.95 | 36.14 |
| $C_2H_5S(CH_2)_3SC(CH_3)_3$ | $C_9H_{20}S_2$ | 68-71 | 0.65 | 56.22 | 10.49 | 33.29 | 56.26 | 10.55 | 33.49 |

The preparative and isolation techniques used for the preparation and recovery of the above compounds are described below with reference to the synthesis of 1-ethylmercapto-3-phenylmercapto-propane. In the reaction a mixture of 110 g. (1 mole) of benzenethiol and 20.4 g. (0.2 mole) of allyl ethyl sulfide were irradiated for 12 hours at 17° C. N.m.r. analyses of samples (a total of 7.9 g.) withdrawn during the reaction showed that the reaction was essentially complete after 4 hours. The reaction mixture was diluted with ether, extracted with 10% aqueous sodium hydroxide, washed with water, and dried over anhydrous sodium sulftae. After removal of the solvent at atmospheric pressure, the remainder was distilled in vacuo to give two fractions, 3.6 g., B.P. 99–121° (1.2 mm.), and 29.6 g., B.P. 121° (1.2–1.5 mm.), respectively. The first fraction was shown by g.l.p.c. to be substantially 1-ethylthio-3-phenylthiopropane contaminated with a material of similar retention time (possibly a 1,2-isomer). The second fraction was the pure unsymmetrical 1,3-diadduct. The distillation residue (3.0 g.) was found by n.m.r. to contain about 70% of this compound and 30% phenyl disulfide. The overall yield was, therefore, 89% of theory.

EXAMPLE 2

A mixture of 1.2 g. (0.02 mole) of ethanethiol and 3.0 g. (0.02 mole) of allyl phenyl sulfide were irradiated with U.V. light for 385 minutes at 17–20° C. Analysis by gas-liquid chromatography showed that the product mixture contained only 6 mole percent of the 1,3-mixed diadduct, 1 - ethylmercapto - 3-phenylmercapto-propane. The overall conversion of the reaction was 40% with the other products being ethyl allyl sulfide, 1,3-bis-(ethylmercapto) - propane and 1,3 - bis - (phenylmercapto)-propane.

Similar experiments were carried out adding ethanethiol to n-propyl allyl sulfide, isopropyl allyl sulfide and tertiary butyl allyl sulfide. The mole percent of the mixed diadduct in the product mixture in each case is shown in Table III.

TABLE III

| RS—: | Mole percent mixed diadduct in product mixture |
|---|---|
| PhS— | 10 |
| $CH_3CH_2CH_2S$— | 63 |
| $(CH_3)_2CHS$— | 71 |
| $(CH_3)_3CS$— | 76 |

Comparison of Tables I and III shows that the order in which two different thiols are added to allene can have an effect on the overall yield of mixed diadduct. The effect is great when the structures of the two thiols are very different, e.g., ethanethiol and benzenethiol. The effect is negligible with two thiols of very similar structure, e.g., n-propanethiol and ethanethiol. For practical use these results show that the poorer hydrogen donor of two thiols should be added first to allene to form an allyl sulfide.

EXAMPLE 3

A mixture of 2.2 g. (0.02 mole) of benzenethiol and 1.02 g. (0.01 mole) of allyl ethyl sulfide was irradiated in a quartz tube for 6.5 hours at 12–15° C. Gas liquid chromatography of the product showed that 60% conversion occurred and that 95 mole percent of the product mixture was the mixed diadduct, 1 - ethylmercapto - 3-phenylmercapto-propane. The only other products were 1,3-bis-(ethylmercapto)-propane (ca. 1%) and allyl sulfide (4%). Similar experiments were carried out using reactant molar ratios of 5:1, 1:1, 1:2 and 1:5 benzenethiol to allyl ethyl sulfide. The results are shown in Table IV and demonstrate that the larger the ratio of thiol to allyl sulfide, the greater the reaction selectivity to the desired mixed diadduct.

TABLE IV

| Reactant, moles | | Reactant molar ratio | Selectivity to diadduct |
|---|---|---|---|
| Benzene thiol | Allyl ethyl sulfide | | |
| 1 | 5 | 0.2 | 75 |
| 1 | 2 | 0.5 | 85 |
| 1 | 1 | 1.0 | 86 |
| 2 | 1 | 2.0 | 95 |
| 5 | 1 | 5.0 | 100 |

EXAMPLE 4

A mixture of 30.6 g. (0.3 mole) of distilled allyl ethyl sulfide and 67 g. (0.36 mole) of distilled diethyl dithiophosphoric acid was placed in a quartz reaction tube equipped with a magnetic stirrer and placed within a water bath thermostated at 15° C. The reaction mixture was then irradiated with a 75 watt Hanau immersion lamp emitting a wide spectrum of ultraviolet irradiation from a high pressure mercury arc. The progress of the irradiation initiated reaction was followed by nuclear magnetic resonance (n.m.r.) spectroscopy of samples taken periodically from the reaction mixture. On the basis of the disappearance of the olefinic hydrogen signals, it could be estimated that the allyl sulfide reactant conversion was 25, 41, 62 and 82% after ½, 2, 8 and 24 hours, respectively.

The crude reaction product was diluted with 300 milliliters of ether and was washed twice with 85 milliliter portions of 5% aqueous sodium hydrogen carbonate solution to remove the unreacted acid. The neutral ether phase was then separated and dried over 25 q. of anhydrous sodium sulfate. The dry solution was then fractionally distilled.

After the removal of the ether and the unreacted allyl ethyl sulfide, the reaction product was distilled at a pressure of 0.1 millimeter of mercury between 126–127° C. and a slightly yellow, mobile liquid recovered. Nuclear magnetic resonance spectroscopy of the product showed that it had the desired structure:

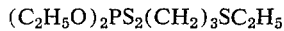

$(C_2H_5O)_2PS_2(CH_2)_3SC_2H_5$

The 65 g. of distilled product obtained corresponds to a theoretical yield of 75%. On the basis of the allyl sulfide reacted, the isolated yield is 93%.

*Elemental analysis.*—Calculated for $C_9H_{20}O_2PS_3$ (wt. percent): C, 37.48; H, 7.33; S, 33.36. Found (wt. percent): C, 38.50; H, 7.88; S, 33.60.

EXAMPLE 5

A mixture of 20.4 g. (0.2 mole) of allyl ethyl sulfide and 39.2 g. (0.25 mole) of dimethyl dithiophosphoric acid was reacted in the manner described in the previous example. Nuclear magnetic resonance spectroscopy indicated that 44, 60 and 73% of the allylic groups reacted after ½, 1 and 2 hours irradiation, respectively. After two hours the reaction mixture was worked up as described in the previous example. After the removal of solvent and unreacted started materials, 35 g. (67% yield) of crude, neutral product was obtained. On the basis of the allyl ethyl sulfide reacted this corresponds to an isolated yield of 92%. The n.m.r. spectrum of the product indicated the desired unsymmetrical structure:

$(CH_3O)_2PS_2CH_2CH_2CH_2SC_2H_5$

*Elemental analysis.*—Calculated for $C_7H_{17}O_2PS_3$ (wt. percent): C, 32.29; H, 6.58; P, 11.89. Found (wt. percent): C, 32.31; H, 6.52; P, 10.53.

EXAMPLE 6

A mixture of 49.5 g. (0.25 mole) of allyl dimethyl dithiophosphate and 31 g. (0.5 mole) of ethanethiol was irradiated for 24 hours in the manner described in Example 4. Nuclear magnetic resonance spectroscopy indicated that 77% of the allylic unsaturation disappeared during the reaction period. A test of the mixture by litmus gave an acidic reaction indicating the formation of dimethyl dithiophosphoric acid due to allylic reversal.

The crude reaction mixture was vacuum stripped to remove the ethanethiol. Thereafter the product was dissolved in ether and washed with 5% aqueous sodium hydrogen carbonate solution to remove the acid. After drying the solution with sodium sulfate and removing the ether in vacuo, 47 g. (72% yield) of neutral diadduct product remained.

Heating of the diadduct mixture at 105° C. at 0.15 millimeters of mercury pressure resulted in the distillation overhead of 12 g. of a 1,3-bis-(ethylthio)-propane symmetrical diadduct. The residue (35 g.) consists of about equimolar quantities of another symmetrical diadduct 1,3 - bis-(dimethoxythiophosphorylthio)-propane and the desired unsymmetrical diadduct, 1-ethylthio-3-dimethoxythiophosphorylthio-propane. The approximate molar ratio of the three diadducts is 7:5:5 in the above order.

The composition of the product mixture indicates poor selectivity to the desired unsymmetrical 1,3-diadduct even though a two-fold excess of the poorer hydrogen donor ethanethiol was used.

EXAMPLE 7

A mixture of 25.5 g. (0.25 mole) of allyl ethyl sulfide and 47.4 g. of crude, dark dimethyl dithiophosphoric acid was heated for 36 hours at about 50° C. Subsequent analysis of the reaction mixture by n.m.r. indicated that 60% of the allylic unsaturation had disappeared. The mixture was worked up as described in Example 4 to provide 43 g. (66% yield) of neutral, crude product containing allyl ethyl sulfide and trimethyl dithiophosphate as minor impurities. These impurities were removed under $7 \times 10^{-3}$ millimeter of mercury pressure at 130° C. to secure 31 g. (50% yield) of residual product. The n.m.r. spectrum indicated that about 93% of the product possessed the ionic adduct structure, i.e.

$(CH_3O)_2PS_2CH(CH_3)CH_2SC_2H_5$

*Elemental analysis.*—Calculated for $C_7H_{17}O_2PS_3$ (wt. percent): C, 32.29; H, 6.58; P, 11.89; S, 36.95. Found (wt. percent): C, 31.44; H, 6.44; P, 12.39; S, 38.06.

In similar fashion, a mixture of allyl methyl sulfide and dimethyl dithiophosphoric acid gave the ionic adduct, $(CH_3O)_2PS_2CH(CH_3)CH_2SCH_3$ upon heating. Likewise, the product formed starting with allyl isopropyl sulfide and dimethyl dithiophosphoric acid gave the ionic adduct product structure $(CH_3O)_2PS_2CH(CH_3)CH_2SCH(CH_3)_2$ upon heating.

EXAMPLE 8

A mixture of 23.2 g. (0.2 mole) of allyl isopropyl sulfide and 39 g. (0.25 mole) of dimethyl dithiophosphoric acid was reacted in the manner described in Example 2 for 6 hours. After the removal of the unreacted reactants, 28 g. neutral, crude product was obtained, i.e., 50% of the theoretical yield. An n.m.r. spectrum of the product indicated that it was mostly $(CH_3O)_2PS_2CH_2CH_2CH_2SCH(CH_3)_2$ A sample of the product was distilled with slight decomposition at 118–120° C. and 3 millimeters of mercury pressure to yield a yellow liquid product.

*Elemental analysis.*—Calculated for $C_8H_{19}O_2PS_3$ (wt. percent): C, 35.02; H, 6.97; P, 11.66; S, 35.06. Found (wt. percent): C, 34.89; H, 6.96; P, 11.24; S, 36.17.

EXAMPLE 9

A mixture of 2.5 g. of allyl methyl sulfide and 5.3 g. of diethyldithiophosphoric acid was placed in a quartz reaction tube and irradiated with U.V. light at ambient temperature for a period of 31 hours. The reaction mixture was then dissolved in ether and washed with an aqueous 5% $Na_2CO_3$ solution to remove the unreacted acid. The solution was washed, dried and distilled. The reaction product was analyzed and found to have the structure:

$(C_2H_5O)_2PS_2(CH_2)_3SCH_3$

EXAMPLE 10

A mixture of 16.8 g. of diethyldithiophosphoric acid and 18.4 g. of allyl p-chlorophenyl sulfide was placed in a quartz reaction tube and irradiated with ultraviolet light for a period of 3 days at ambient temperature (approximately 20° C.). The reaction product was washed with a 5% aqueous $Na_2CO_3$ solution and dried over anhydrous $Na_2SO_4$. The product was analyzed by nuclear magnetic resonance and found to be:

$(C_2H_5O)_2PS_2(CH_2)_3SC_6H_5Cl$

EXAMPLE 11

A mixture of 11.6 g. (0.1 mole) of allyl thiolacetate and 37.2 g. (0.2 mole) of diethyl dithiophosphoric acid is reacted as described in Example 4 to yield the corresponding unsymmetrical diadduct of structure $(C_2H_5O)_2PS_2CH_2CH_2CH_2SCOCH_3$

EXAMPLE 12

A mixture of 8.8 g. (0.1 mole) of allyl methyl sulfide and 15.5 g. (0.15 mole) diethyl monothiophosphoric acid is irradiated as described in Example 4 to yield the unsymmetrical diadduct of structure:

$(C_2H_5O)_2P(O)SCH_2CH_2CH_2SCH_3$

EXAMPLE 13

A mixture of 30 g. (0.10 mole) of hexadecyl allyl sulfide and 33 g. (0.12 mole) of mercaptopropionic acid lauryl ester is irradiated at 50° C. to yield the corresponding unsymmetrical 1,3-bis-(substituted mercapto)-propane:

$C_{16}H_{33}SCH_2CH_2CH_2SCH_2CH_2CO_2C_{12}H_{25}$

EXAMPLE 14

Samples of the mixed diadducts described in Examples 4, 5 and 7–10 were tested for insecticidal, miticidal and nematocidal activity. These tests were performed by the following general procedures:

Insecticide screening

Mexican bean beetle tests—Lima bean leaves sprayed on the dorsal and ventral surface are offered to ten larvae of the Mexican bean beetle (late second instar) for a forty-eight hour feeding period. The feeding rate and mortality data are recorded as well as foliage injury, if any. The positive standards are 0.05% DDT and 0.1% Methoxychlor, which are commercial insecticides known to give 100% control at these concentrations.

Pea aphid tests—Adult pea aphids are sprayed and transferred to sprayed pea plants and held for forty-eight hour mortality determinations. Foliage injury, if any, is recorded. DDT at 0.05% concentration is used as the positive standard.

Systemic insecticidal activity is evaluated by applying 20 ml. of 0.01% concentration of the sample to the vermiculite substratum of potted pea plants. Forty-eight hours after application the plants are infested with ten adult pea aphids and mortality determination is made after five days. Demeton at 0.01% concentration, a commercial insecticide known to give 100% control at this concentration, is used as the positive standard.

Miticide screening

Spider mite tests—Lima bean plants are infested with fifty to one hundred adults of the strawberry spider mite, Tetranychus atlanticus, prior to testing. The infested plants are dipped into the test material and held for five days. Adult mortality as well as ovicidal action is noted. Aramite and Ovotran are used as positive standards at 0.1% concentration. These latter compounds are commercial miticides which are known to give 100% control at this concentration.

The results of these tests are summarized in Table V.

activity of a compound formed with the process of the present invention was compared with the biological activity of a structurally related dithiophosphate composition. In the first test, Disyston, a leading commercial pesticidal composition having the general formula:

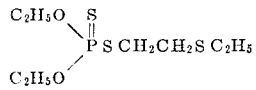

and a compound prepared according to the instant process having the general formula:

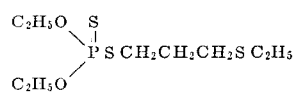

were each tested for effectiveness against the Mexican bean beetle using a routine WARF test. The spray concentration for 50% pest control for Disyston was 0.050%. In contrast, the spray concentration for 50% pest control for the gamma-compound was 0.005%. This means that the composition formed according to the instant process has a killing power equal to the commercially employed, closely related compound at $\frac{1}{10}$ the concentration employed when Disyston is used.

EXAMPLE 16

Compounds prepared according to the present process were compared for nematocidal activity with a structurally

TABLE V

| | | | Mortality of insects | | | |
|---|---|---|---|---|---|---|
| | | | | Mexican bean beetles | Pea aphids | Spider mites |
| Product of example | Chemical structure of product tested | Conc., percent | | | Contact / Systemic | |
| 4 | $(C_2H_5O)_2P(S)S(CH_2)_3SC_2H_5$ | 0.010 | 100 | 100 | 100 | 100 |
| | | 0.007 | 100 | 100 | 100 | 100 |
| | | 0.005 | | 90 | 90 | 90 |
| 5 | $(CH_3O)_2P(S)S(CH_2)_3SC_2H_5$ | 0.050 | 100 | 100 | 100 | 100 |
| | | 0.010 | 90 | | 100 | 100 |
| 7 | $(CH_3O)_2P(S)SCH(CH_3)CH_2SC_2H_5$ | 0.050 | 0 | | 100 | 90 |
| | | 0.010 | 0 | | 100 | 50 |
| 8 | $(CH_3O)_2P(S)S(CH_2)_3SCH(CH_3)_2$ | 0.025 | 40 | 100 | 100 | 83 |
| | | 0.010 | | 40 | 100 | 80 |
| | | 0.005 | | | 100 | 50 |
| 9 | $(C_2H_5O)_2P(S)S(CH_2)_3SCH_3$ | 0.050 | 100 | 100 | 100 | 100 |
| | | 0.025 | | | 100 | 100 |
| | | 0.010 | | | 100 | 100 |
| | | 0.005 | | | 100 | |
| | $(C_2H_5O)_2P(S)O(CH_2)_3SCH_3$ | 0.010 | | 0 | 0 | 0 |
| 10 | $(C_2H_5O)_2P(S)S(CH_2)_3S\text{-}C_6H_4\text{-}Cl$ | 0.050 | 100 | 0 | 0 | 85 |

The results of the tests indicate that 1-dialkylphosphorylthio-3-hydrocarbylthio-propane unsymmetrical diadducts are effective pesticides. A comparison between the effectiveness of the unsymmetrical 1,3-diadduct of Example 5 and the corresponding unsymmetrical 1,2-diadduct of Example 7 shows that the 1,3-compound has a superior effectiveness against bean beetles. Another comparison between a 1,3-dithiophosphate compound of Example 9 and the corresponding mono-thionophosphate compound (prepared by the relation of 3-methylthiopropanol with diethoxythiophosphoryl chloride in the presence of pyridine) shows that the presence of two sulfur groups in the gamma position, i.e., the thiolphosphate structure, is necessary for high pesticidal effectiveness.

EXAMPLE 15

A series of tests was conducted by the Wisconsin Alumni Research Foundation (WARF) in which the biological related commercial nematocide produced using other techniques. The compounds were tested at 0.41 g. per gallon of soil equivalent to 100 lbs. per four inch acre. Nemagon, a commercial nematocide, was used as a positive control at a concentration of 40 lbs. per four inch acre. All samples were formulated into 10% dusts for mixture with soil.

Meloidogyne sp. nematodes were reared into tomato plant soil culture. The test soil was inoculated with infected soil and root knots from infected tomato plants. Uninoculated soil was employed for control and phytotoxic effects. Chemical dusts were blended thoroughly with the soil in a V-shell blender. Four one-pint paper pots were used for each treatment with one tomato transplant per pot. After three to four weeks under artificial lighting and overhead irrigation, the roots of the plants are examined for degree of root knot formation. Inoculated controls normally have 80–100 root knots per plant. Percent control is recorded by comparison of the knot counts on treated and untreated tomato plants.

The results of the test are set forth in Table VI below:

TABLE VI

| Product of Example | Structural formula | Summary formula | Nematode control, percent (at lbs./acre chemical) | |
|---|---|---|---|---|
| | | | (100) | (40) |
| 7 | $(CH_3O)_2\underset{\underset{S}{\parallel}}{P}SCH_2CH_2CH_2SC_2H_5$ | $C_7H_{17}O_2PS_3$ | 100 | 100 |
| 9 | $(C_2H_5O)_2\underset{\underset{S}{\parallel}}{P}SCH_2CH_2CH_2SCH_3$ | $C_8H_{19}O_2PS_3$ | 95 | |
| Disyston | $(C_2H_5O)_2\underset{\underset{S}{\parallel}}{P}SCH_2CH_2SC_2H_5$ | $C_8H_{19}O_2PS_3$ | 50 | 30 |

The tests show that at a rate of 100 lbs./acre a compound prepared according to Example 7 gave 100% control at rates of 40 and 100 lbs./acre. The compounds described in Example 9 produced a 95% control of the nematodes. The third compound, Disyston, a known and commonly used structural isomer of the other compounds, prepared using other techniques, controlled nematodes only to the extent of 50% at a rate of 100 pounds of chemical per acre and 30% at a rate of 40 pounds of chemical per acre. This evidences that phosphate ester compositions having three carbon atoms between the two chain sulfur atoms, which compounds are formed according to the present process, are suprisingly superior nematocides to known phosphate esters having only two carbon atoms between the chain sulfur atoms of the composition.

EXAMPLE 17

Comparative field trials were made by the Wisconsin Alumni Research Foundation against the potato flea beetle using the unsymmetrical diadduct product of Example 4, commercial Systox and Malathion. These materials were applied as emulsion sprays prepared from a formulation identical with that of commercial Systox at the rate of 100 gallons/acre (point of run off) to 25 foot rows of potato plants at the concentration of actual compound (lbs./acre) listed. Infestation determinations were made prior to treatment and one, three and seven days following treatment by making 5 sweeps with a net (2 plants per sweep) over the 25 foot row. The actual number of beetles counted and the percent reduction of the infestation based on the untreated control were determined. No measurable rain fell during the test period. The results are listed in Table VII below:

male mice, Swiss-Webster strain, weighing between 30 and 35 grams, were used to determine the acute oral toxicity of the respective dithiophosphates. The mice were housed in individual screen-bottom cages and fed water and laboratory chow and libitum. The animals were given a single calculated dose via stomach syringe and were thereafter observed for a two-week period. The approximate medium lethanol concentrations, expressed in milligrams per kilogram of mouse body weight, were found to be the following:

TABLE VIII

| Product of | Structural formula | $LD_{50}$, mg./kg. |
|---|---|---|
| Example 7 | $(CH_3O)_2\underset{\underset{S}{\parallel}}{P}SCH_2CH_2CH_2SC_2H_5$ | 350 |
| Commerce (Disyston) | $(C_2H_5O)_2\underset{\underset{S}{\parallel}}{P}SCH_2CH_2SC_2H_5$ | 5 |

The data set forth in Table VIII indicates that the median lethol dosage of an ester compound prepared according to the present process is 70 times less than a closely related compound prepared using other techniques.

The nematocidal, insecticidal and miticidal compositions produced with this invention may be employed by either solid or liquid form. When used in solid form, they may be reduced to an impalpable powder and employed as an undiluted dust or they may be admixed with a solid carrier such as clay, talc or bentonite as well as other carriers known in the art. The compositions may also be applied as a spray in a liquid carrier either as a solution in a solvent or as a suspension in a nonsolvent, such as water. Typical solvents are organic compounds such as

TABLE VII

| Active compound | | Field conc., lbs./acre in 100 gal. water | Reduction of beetle population, percent Days after application | | |
|---|---|---|---|---|---|
| Derivation | Chemical structure | | 1 day | 2 days | 3 days |
| Example 4 | $(C_2H_5O)_2P(S)SCH_2CH_2CH_2SC_2H_5$ | 0.5 | 92 | 89 | 67 |
| Commercial control, Systox (Demeton) | $(C_2H_5O)_2P(O)SCH_2CH_2SC_2H_5$ | 0.5 | 78 | 78 | 41 |
| Commercial control, Malathion | $(CH_3O)_2P(S)SCHCO_2C_2H_5$<br>$\qquad\qquad\qquad\mid$<br>$\qquad\qquad\quad CH_2CO_2C_2H_5$ | 0.5<br>1 | Nil<br>75 | Nil<br>Nil | Nil<br>Nil |

The results of Table VII show that the product of Example 4 was more effective in the field than Systox and Malathion. It was particularly interesting to observe that the product exhibited longer lasting pest control than the structurally related Systox.

EXAMPLE 18

Another test series was conducted to compare the toxicity toward warm-blooded animals of compounds prepared according to the present process with a structurally related dithiophosphate of Example 7. In the tests, adult acetone, ethyl alcohol, benzene, naphtha, etc., although different compounds exhibit different solubilities for the novel compositions. In some instances, it may be preferable to admix the composition with wetting agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated and consequently brings the active ingredient into intimate contact with the parasite life. Suitable wetting agents include the sulfates of long-chain alcohols such as dodecanol and octadecanol, sulfonated amide and ester derivatives, sulfonated aromatic and mixed alkyl aryl derivatives, esters of fatty acid such as the ricinoleic esters of sorbitol and petroleum sulfonates of $C_{10}$ to $C_{20}$ lengths. The nonionic emulsifying agents such as the ethylene oxide condensation products of alkylated phenols may also be used. The compounds of this invention may also be admixed with carriers that are themselves active fungicidal and nematocidal compositions.

It is to be understood that the invention is not limited to the specific examples which have been offered merely as illustrations and that modifications may be made without departing from the spirit of the invention.

What is claimed is:

1. A process for preparing an unsymmetrical thiolallene diadduct which comprises contacting a monoadduct allyl sulfide having the structural formula:

$$RS\text{—}CH_2\text{—}CH=CH_2$$

with a thiol compound having the structural formula R'SH in the liquid phase for a time sufficient to recover an unsymmetrical diadduct having the general formula:

$$RS\text{—}(CH_2)_3\text{—}SR'$$

wherein R and R' are differing monovalent organic radicals having from 1 to 30 carbon atoms and said R'SH compound has a higher hydrogen donor ability relative to the thiol corresponding to the RS— radical of the said monoadduct allyl sulfide.

2. The process of claim 1 wherein R is selected from the group consisting of $C_1$ to $C_{20}$ alkyl radicals, $C_6$ to $C_{14}$ aryl radicals and C to $C_{14}$ haloaryl radicals and R' is a dihydrocarbyloxythiophosphoryl radical having the general formula:

wherein X and X' are $C_1$ to $C_{10}$ hydrocarbyl radicals.

3. The process of claim 1 wherein R and R' are different radicals selected from the group consisting of $C_1$ to $C_{20}$ alkyl radicals, $C_6$ to $C_{14}$ aryl radicals, $C_6$ to $C_{14}$ haloaryl radicals, acyl radicals having the general formula:

wherein Z is a $C_1$ to $C_{18}$ hydrocarbyl radical, and dihydrocarbyloxyphosphoryl radicals having the formula:

wherein X and X' are $C_1$ to $C_{18}$ hydrocarbyl radicals and Y is selected from the group consisting of sulfur and oxygen atoms.

4. The process of claim 3 wherein Z, X, and X' are $C_1$ to $C_{10}$ alkyl radicals.

5. The process of claim 3 wherein the said alkyl radicals have from 1 to 10 carbon atoms.

6. The process of claim 3 wherein said reaction is conducted at a temperature ranging from —100 to 150° C. in the presence of a free radical initiator.

7. The process of claim 6 wherein said reaction is conducted in the presence of a molar excess of said thiol.

8. The process of claim 7 wherein said reaction is conducted at a temperature ranging from 0 to 50° C.

9. The process of claim 6 wherein said free radical initiator is ultraviolet light.

10. The process of claim 6 wherein said reaction product contains at least about 50 mole percent of the desired unsymmetrical adduct.

11. The process of claim 1 wherein R is selected from the group consisting of $C_1$ to $C_{20}$ alkyl radicals, $C_6$ to $C_{14}$ aryl radicals, $C_6$ to $C_{14}$ haloaryl radicals and R' is selected from the group consisting of acyl radicals having the general formula:

wherein Z is a $C_1$ to $C_{18}$ hydrocarbyl radical and dihydrocarbyloxythiophosphoryl and dihydrocarbyloxyphosphoryl radicals having the formula:

wherein X and X' are $C_1$ to $C_{18}$ hydrocarbyl radicals and Y is selected from the group consisting of sulfur and oxygen atoms.

12. The process of claim 11 wherein Y is a sulfur atom.

13. A process for preparing an unsymmetrical thiolallene diadduct which comprises contacting a thiol compound having the formula RSH with a molar excess of allene in the liquid phase in the presence of a free radical initiator for a time sufficient to recover a monoadduct allyl sulfide having the structural formula:

$$RS\text{—}CH_2\text{—}CH=CH_2$$

and reacting said monoadduct with a thiol compound having the structural formula R'SH in the presence of a free radical initiator for a time sufficient to recover a product containing at least about 50 mole percent of an unsymmetrical adduct having the general formula:

$$RS\text{—}(CH_2)_3\text{—}SR'$$

wherein R and R' are differing $C_1$ to $C_{30}$ organic radicals, said R'SH compound possessing superior hydrogen donor ability relative to said RSH compound.

14. The process of claim 13 wherein said reactions are conducted at temperatures ranging from —100 to 150° C.

15. The process of claim 14 wherein R and R' are different radicals selected from the group consisting of $C_1$ to $C_{20}$ alkyl radicals, $C_6$ to $C_{14}$ aryl radicals, $C_6$ to $C_{14}$ haloaryl radicals, acyl radicals having the general formula:

wherein Z is a $C_1$ to $C_{18}$ hydrocarbyl radical, and dihydrocarbyloxythiophosphoryl and dihydrocarbyloxyphosphoryl radicals having the formula:

wherein X and X' are $C_1$ to $C_{18}$ hydrocarbyl radicals and Y is selected from the group consisting of sulfur and oxygen molecules.

16. The process of claim 15 wherein the molar ratio of allene to said RSH compound varies from 2:1 to 10:1.

17. The process of claim 16 wherein said reaction between said monoadduct allyl sulfide and R'SH is conducted in the presence of a molar excess of said R'SH compound.

18. The process of claim 17 wherein R and R' are selected from the group consisting of $C_1$ to $C_{10}$ alkyl groups, $C_6$ to $C_{12}$ aryl groups, $C_6$ to $C_{12}$ haloaryl groups, dihydrocarbyloxyphosphoryl and dihydrocarbyloxyphosphoryl groups having the structural formula:

wherein X and X' are $C_1$ to $C_{10}$ alkyl radicals and Y is a sulfur atom.

19. The process of claim 18 wherein said reactions are conducted at a temperature varying from about 0 to 50° C.

References Cited

J. Organic Chemistry, vol. 28 (August 1963), pages 1952–56.

HOWARD S. WILLIAMS, Primary Examiner

U.S. Cl. X.R.

204—158HE, 162, 162HE; 260—609; 424—215